US012675580B2

(12) United States Patent
Bangalore Lakshman et al.

(10) Patent No.: US 12,675,580 B2
(45) Date of Patent: Jul. 7, 2026

(54) CERTIFICATION OF DEVICE CALIBRATIONS

(71) Applicant: Micron Technology, Inc., Boise, ID (US)

(72) Inventors: Shashank Bangalore Lakshman, Folsom, CA (US); Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 60 days.

(21) Appl. No.: 18/637,274

(22) Filed: Apr. 16, 2024

(65) Prior Publication Data

US 2024/0354422 A1 Oct. 24, 2024

Related U.S. Application Data

(60) Provisional application No. 63/460,837, filed on Apr. 20, 2023.

(51) Int. Cl.
| | |
|---|---|
| *G06F 21/00* | (2013.01) |
| *G06F 21/55* | (2013.01) |
| *G06F 21/57* | (2013.01) |
| *G06F 21/64* | (2013.01) |

(52) U.S. Cl.
CPC .......... *G06F 21/577* (2013.01); *G06F 21/554* (2013.01); *G06F 21/64* (2013.01)

(58) Field of Classification Search
None
See application file for complete search history.

(56) References Cited

U.S. PATENT DOCUMENTS

| | | | | |
|---|---|---|---|---|
| 9,600,666 | B1* | 3/2017 | Harter | H04L 63/1433 |
| 10,341,216 | B2* | 7/2019 | Choi | H04L 67/12 |
| 10,797,873 | B2* | 10/2020 | Reading | H04L 9/3239 |
| 10,803,177 | B2* | 10/2020 | Adam | G06F 21/563 |
| 11,516,191 | B2* | 11/2022 | Wang | H04L 63/10 |
| 2012/0099630 | A1* | 4/2012 | Verhelst | H04B 17/16 |
| | | | | 455/67.11 |
| 2017/0070320 | A1* | 3/2017 | Choi | H04L 67/12 |
| 2017/0195360 | A1* | 7/2017 | Harter | H04L 63/1408 |
| 2018/0075236 | A1* | 3/2018 | Kwon | G06F 21/44 |
| 2024/0104211 | A1* | 3/2024 | Kaiser | G06F 11/267 |

* cited by examiner

*Primary Examiner* — Maung T Lwin
(74) *Attorney, Agent, or Firm* — Holland & Hart LLP

(57) ABSTRACT

Methods, systems, and devices for certification of device calibrations are described. Calibration information may be stored in a memory system having a cryptographic engine and included in the vehicle. An authentication platform may securely receive requests from a remote compliance device information associated with calibration for a vehicle that must be certified. The authentication platform may verify the identity of the compliance device and securely communicate a test authorization request to the vehicle. Compliance information pertaining to results of performing a compliance test for the vehicle may be subsequently communicated to the authentication platform.

20 Claims, 7 Drawing Sheets

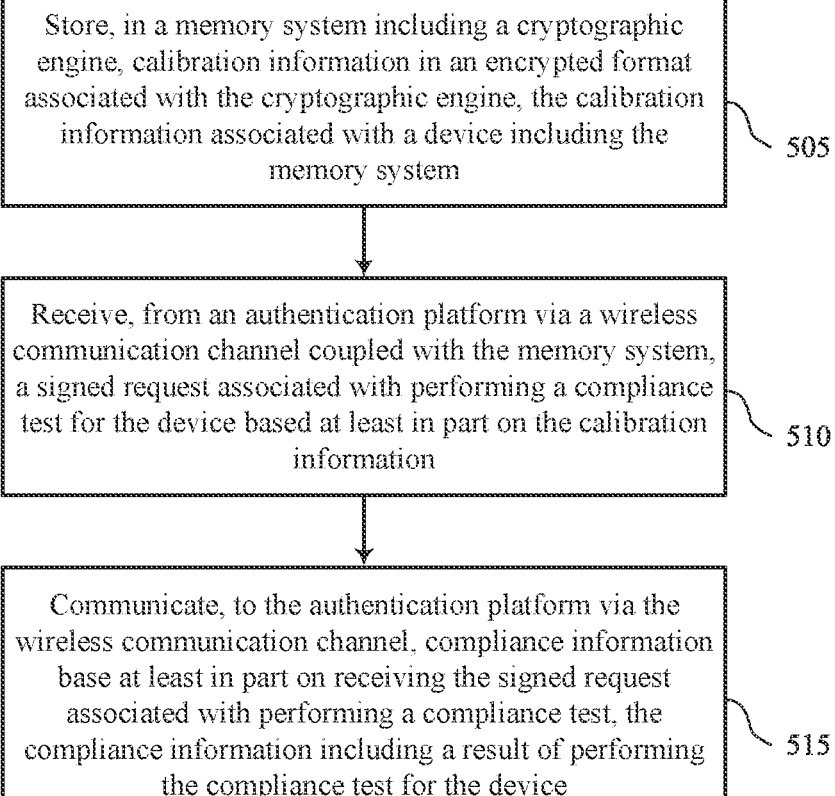

Store, in a memory system including a cryptographic engine, calibration information in an encrypted format associated with the cryptographic engine, the calibration information associated with a device including the memory system

505

Receive, from an authentication platform via a wireless communication channel coupled with the memory system, a signed request associated with performing a compliance test for the device based at least in part on the calibration information

510

Communicate, to the authentication platform via the wireless communication channel, compliance information base at least in part on receiving the signed request associated with performing a compliance test, the compliance information including a result of performing the compliance test for the device

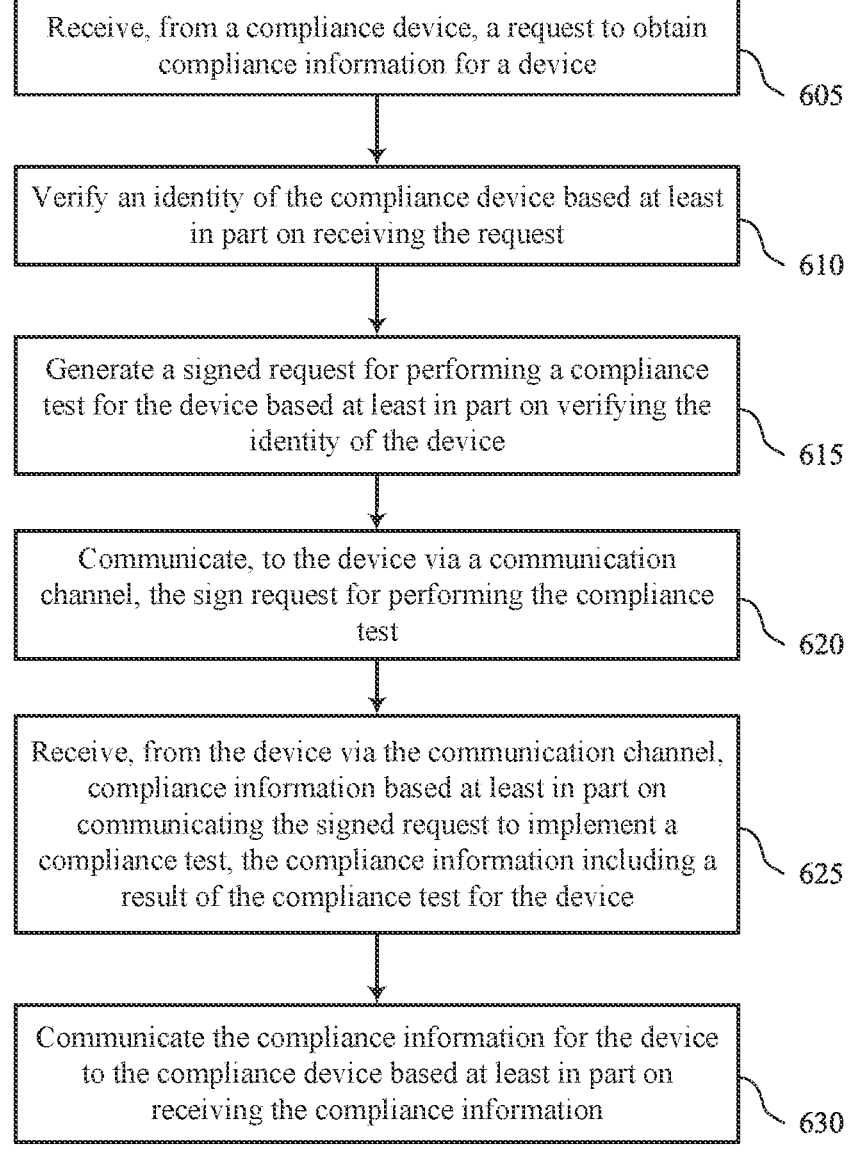

Receive, from a compliance device, a request to obtain compliance information for a device

605

Verify an identity of the compliance device based at least in part on receiving the request

610

Generate a signed request for performing a compliance test for the device based at least in part on verifying the identity of the device

615

Communicate, to the device via a communication channel, the sign request for performing the compliance test

620

Receive, from the device via the communication channel, compliance information based at least in part on communicating the signed request to implement a compliance test, the compliance information including a result of the compliance test for the device

625

Communicate the compliance information for the device to the compliance device based at least in part on receiving the compliance information

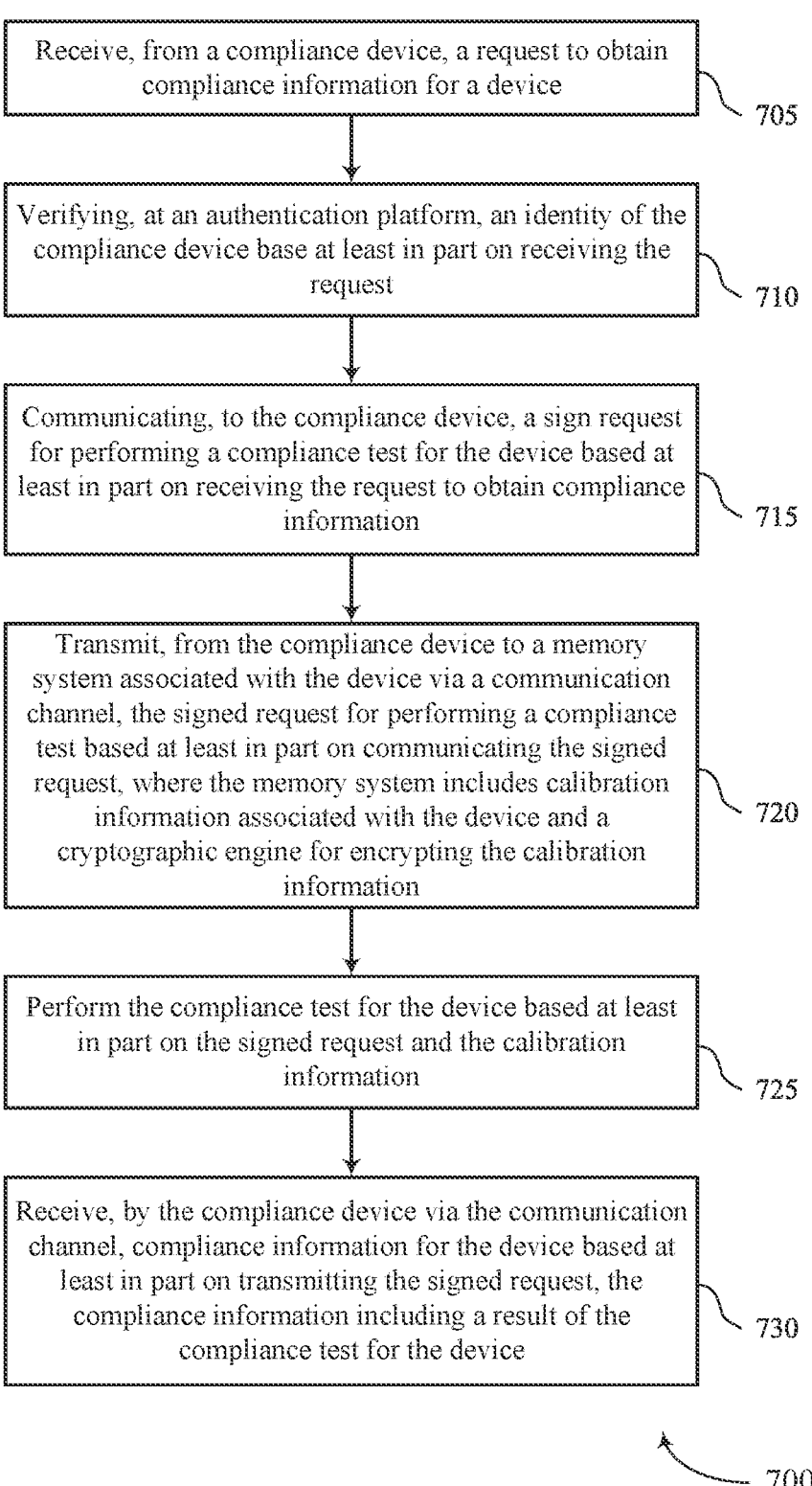

Receive, from a compliance device, a request to obtain compliance information for a device

705

Verifying, at an authentication platform, an identity of the compliance device base at least in part on receiving the request

710

Communicating, to the compliance device, a sign request for performing a compliance test for the device based at least in part on receiving the request to obtain compliance information

715

Transmit, from the compliance device to a memory system associated with the device via a communication channel, the signed request for performing a compliance test based at least in part on communicating the signed request, where the memory system includes calibration information associated with the device and a cryptographic engine for encrypting the calibration information

720

Perform the compliance test for the device based at least in part on the signed request and the calibration information

725

Receive, by the compliance device via the communication channel, compliance information for the device based at least in part on transmitting the signed request, the compliance information including a result of the compliance test for the device

CERTIFICATION OF DEVICE CALIBRATIONS

CROSS REFERENCE

The present Application for Patent claims priority to U.S. Patent Application No. 63/460,837 by Bangalore Lakshman et al., entitled "CERTIFICATION OF DEVICE CALIBRA-TIONS," filed Apr. 20, 2023, which is assigned to the assignee hereof, and which is expressly incorporated by reference in its entirety herein.

TECHNICAL FIELD

The following relates to one or more systems for memory, including certification of device calibrations.

BACKGROUND

Memory devices are widely used to store information in devices such as computers, user devices, wireless commu-nication devices, cameras, digital displays, and others. Infor-mation is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including mag-netic hard disks, random access memory (RAM), read-only memory (ROM), dynamic RAM (DRAM), synchronous dynamic RAM (SDRAM), static RAM (SRAM), ferroelec-tric RAM (FeRAM), magnetic RAM (MRAM), resistive RAM (RRAM), flash memory, phase change memory (PCM), self-selecting memory, chalcogenide memory tech-nologies, not-or (NOR) and not-and (NAND) memory devices, and others. Memory cells may be described in terms of volatile configurations or non-volatile configurations. Memory cells in a non-volatile configuration may maintain stored logic states for extended periods of time even in the absence of an external power source. Memory cells in a volatile configuration may lose stored states when discon-nected from an external power source.

BRIEF DESCRIPTION OF THE DRAWINGS

FIGS. 5 through 7 show flowcharts illustrating a method or methods that support the certification of device calibra-tions in accordance with examples as disclosed herein.

DETAILED DESCRIPTION

Figure 1:
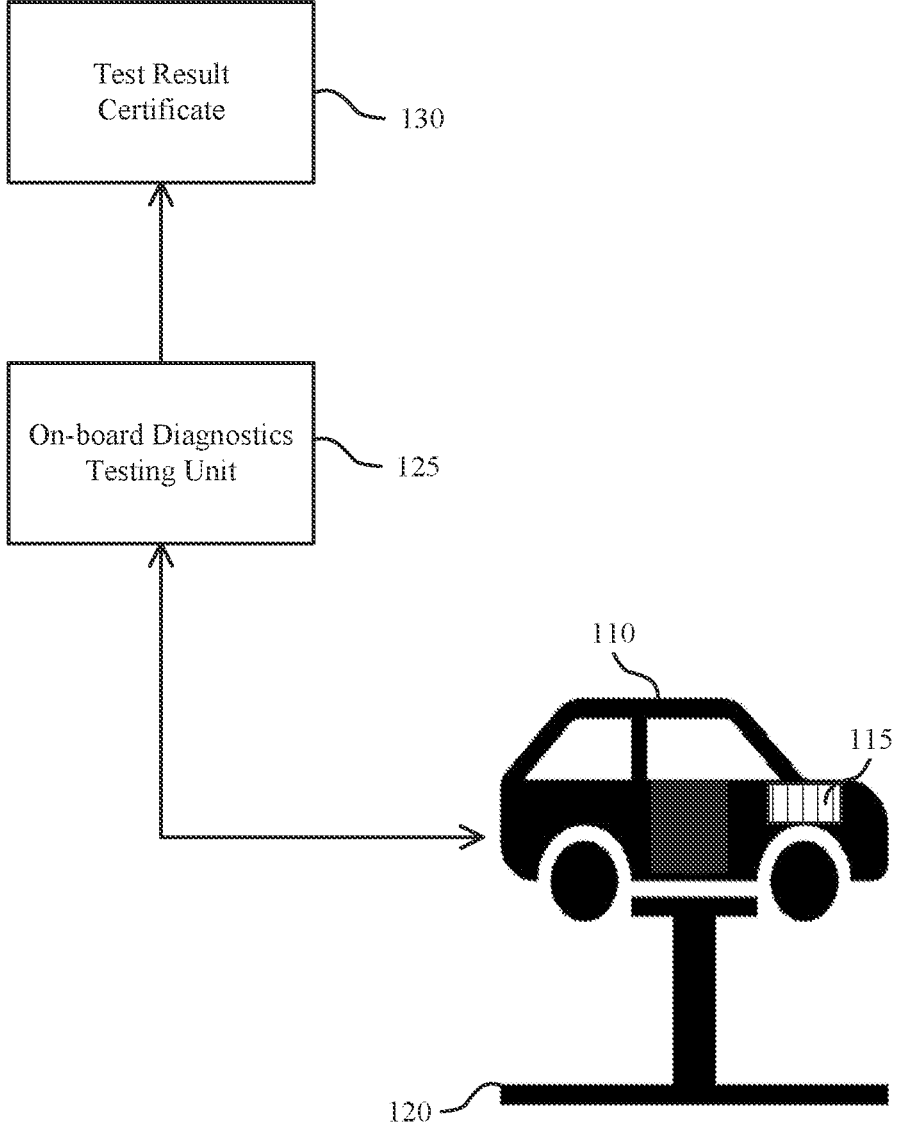
FIG. 1 shows an example of a system that supports the certification of device calibrations in accordance with examples as disclosed herein.

Modern devices typically require one or more types of calibration to maintain operational efficiency or compliance with different standards, regulations, etc. The calibration may be in the form of different tests and inspections depend-ing on the device. It is generally necessary to take the device to an inspection facility or dispatch an inspection personnel to the device location in order to conduct the test or inspection. Modern vehicles are examples of, or include, devices that periodically require calibration in the form of testing, such as emissions testing. Compliance with various standards (e.g., local & international emissions standards) is typically subject to strict laws and regulations. Furthermore, different entities (e.g., regulators) may be responsible for implementing the testing and certification related to the calibration. It is sometimes possible, however, for individu-als as well as organizations to tamper with device calibra-tions, such as automotive calibrations, and deceive the regulators by creating false reporting, backchannels, hack-ing, etc. In some instances, regulatory certifications may occur at the start of mass production, prior to customer delivery, or during vehicle registration, thereby making it difficult to verify the actual status of calibrations for the device, such as a vehicle.

Techniques are described for implementing secure cali-bration using a cloud-based authentication platform. The authentication platform may securely receive requests from a remote compliance device when testing or information (e.g., software) associated with calibration for devices, such as vehicles, must be verified. The authentication platform may verify the identity of the compliance device and securely communicate a test authorization request to the device. The authentication platform may be configured to store information associated with the calibration of different devices, such as vehicles. In some examples, the device may include a memory system with one or more cryptographic engines capable of storing calibration information for the device in an encrypted format. The memory system may be part of an onboard diagnostic component of the device or part of a dedicated calibration component. The authentica-tion platform may communicate with the device using a communication channel that may be wired or wireless. Features of the disclosed examples allow compliance devices, such as regulators, to securely request and verify calibration of different devices via a cloud platform without knowledge of private keys associated with the device. Fur-thermore, compliance testing may be requested by the regulator (or appropriate entity) and performed by the device in real-time. Compliance testing may also be scheduled periodically or randomly.

Features of the disclosure are initially described in the context of a system that supports certification of device calibrations as described with reference to FIG. 1. Features of the disclosure are described in the context systems and dies as described with reference to FIG. 2. Features of the disclosure are described in the context of a process that supports certification of device calibrations as described with reference to FIG. 3. These and other features of the disclosure are further illustrated by and described with reference to an apparatus diagram and flowcharts that relate to certification of device calibrations as described with reference to FIGS. 4 through 7.

FIG. 1 shows an example of a system 100 that supports certification of device calibrations in accordance with examples as disclosed herein. The system 100 may be used to conduct compliance testing on a device, which may be included as part of a vehicle 110. The compliance test may be in the form of an emission test to certify compliance with regulatory requirements. According to the illustrated example, the vehicle 110 may include a memory system 115 for storing calibration information associated with the compliance test. In some examples, the calibration information may include one or more parameters usable for controlling components associated with the device while performing the compliance test. The memory system 115 may include a secure storage portion for storing the calibration information and an encryption engine for encrypting the calibration information.

The system 100 may include a testing mechanism 120 such as a hydraulic lift to raise the vehicle 110. The testing mechanism 120 may include a driving platform which allows the vehicle 110 to simulate driving operations without actual movement. In some examples, the system 100 may include an on-board diagnostics (OBD) testing unit 125 capable of communicating with the vehicle 110 using a wired connection. The OBD testing unit 125 may monitor various conditions associated with the vehicle 110 during the compliance test. In some examples, the OBD testing unit 125 may access the calibration information stored in the memory system 115 during the compliance test. The OBD testing unit 125 may determine when the results of the compliance test are indicative of a pass status or fail status for the vehicle 110. Based on the results of the compliance test, the OBD testing unit 125 may generate a test result certificate 130 corresponding to the result of the compliance test. The test result certificate 130 may subsequently be provided to the operator of the vehicle 110 by one or more methods.

According to the illustrated example, the testing mechanism 120 and OBD testing unit 125 may be located in a testing facility. Thus, the vehicle 110 must be driven to the testing facility to perform the compliance test. If the vehicle 110 successfully passes the compliance test, test result certificate may be a physical document that must be kept within the vehicle 110. In such instances, it may be inconvenient or difficult for a consumer to travel to a testing facility in order to receive a compliance test. Furthermore, some devices may require physical shipment to a testing facility, thereby resulting in lost time and/or revenue. It may also be possible for certain individuals as well as organizations to tamper with the device calibrations and deceive the regulators by creating false reporting, backchannels, hacking, etc.

In some examples, security may be implemented based at least in part on using the memory system 115. The device calibrations may be stored, for example, in the secure storage portion of the memory system 115. The secure storage portion may require one or more types of security credentials for access to the secure storage portion. Individuals lacking proper security credentials (e.g., encryption keys, passwords, etc.) may be denied access to, or otherwise discouraged from attempting to bypass, the device calibration or otherwise discouraged from attempting to bypass. Thus, unauthorized access to the device calibrations may be reduced and/or prevented.

Figure 2:
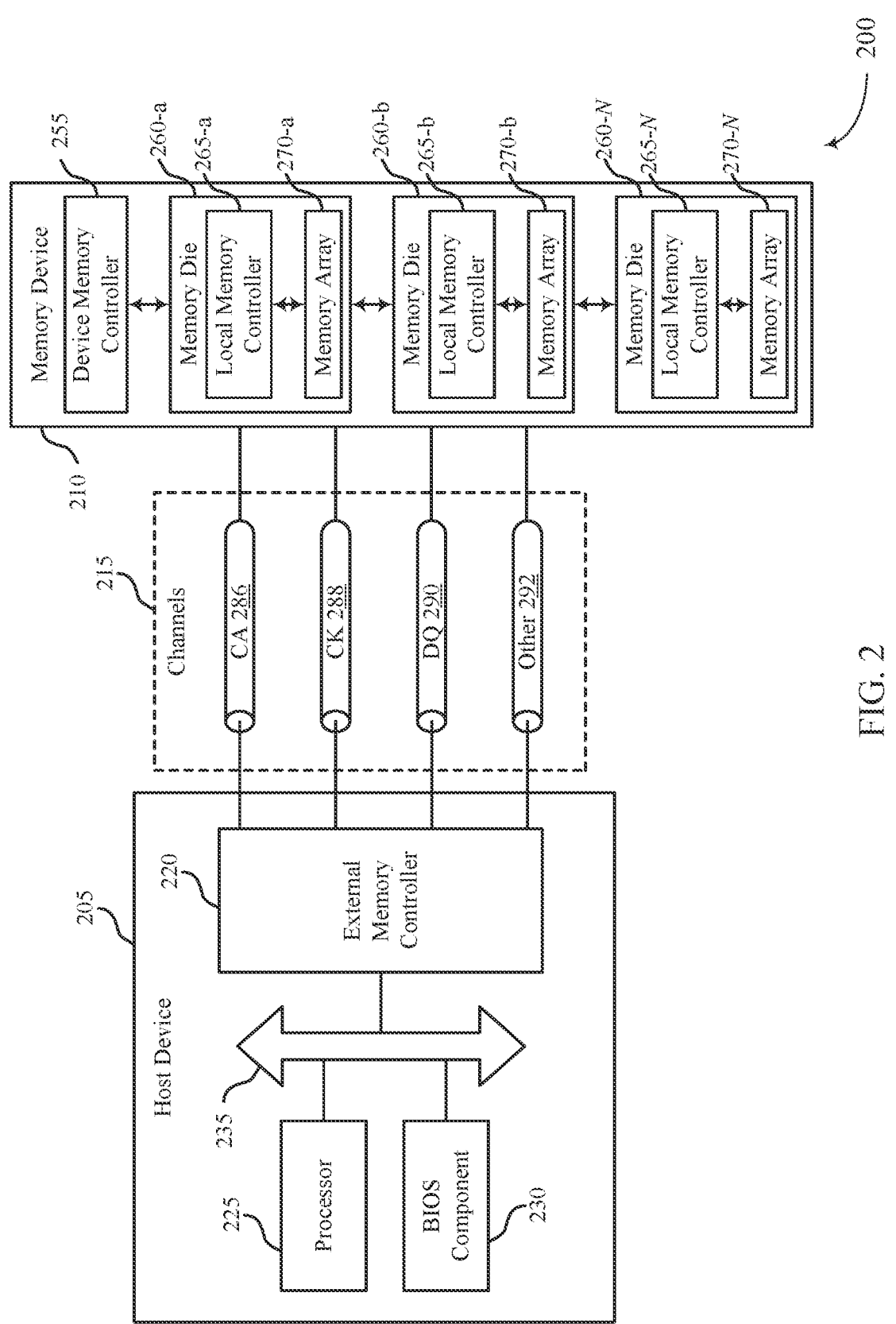
FIG. 2 shows an example of a system that supports the certification of device calibrations in accordance with examples as disclosed herein.

FIG. 2 shows an example of a system 200 that supports certification of device calibrations in accordance with examples as disclosed herein. The system 200 may include a host device 205, a memory device 210, and a plurality of channels 215 coupling the host device 205 with the memory device 210. The system 200 may include one or more memory devices 210, but aspects of the one or more memory devices 210 may be described in the context of a single memory device (e.g., memory device 210).

The system 200 may include portions of an electronic device, such as a computing device, a mobile computing device, a wireless device, a graphics processing device, a vehicle, or other systems. For example, the system 200 may illustrate aspects of a computer, a laptop computer, a tablet computer, a smartphone, a cellular phone, a wearable device, an internet-connected device, a vehicle controller, or the like. The memory device 210 may be a component of the system 200 that is operable to store data for one or more other components of the system 200.

Portions of the system 200 may be examples of the host device 205. The host device 205 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 205 may refer to the hardware, firmware, software, or any combination thereof that implements the functions of an external memory controller 220. In some examples, the external memory controller 220 may be referred to as a host (e.g., host device 205).

A memory device 210 may be an independent device or a component that is operable to provide physical memory addresses/space that may be used or referenced by the system 200. In some examples, a memory device 210 may be configurable to work with one or more different types of host devices. Signaling between the host device 205 and the memory device 210 may be operable to support one or more of: modulation schemes to modulate the signals, various pin configurations for communicating the signals, various form factors for physical packaging of the host device 205 and the memory device 210, clock signaling and synchronization between the host device 205 and the memory device 210, timing conventions, or other functions.

The memory device 210 may be operable to store data for the components of the host device 205. In some examples, the memory device 210 (e.g., operating as a secondary-type device to the host device 205, operating as a dependent-type device to the host device 205) may respond to and execute commands provided by the host device 205 through the external memory controller 220. Such commands may include one or more of a write command for a write operation, a read command for a read operation, a refresh command for a refresh operation, or other commands.

The host device 205 may include one or more of an external memory controller 220, a processor 225, a basic input/output system (BIOS) component 230, or other components such as one or more peripheral components or one or more input/output controllers. The components of the host device 205 may be coupled with one another using a bus 235.

The processor 225 may be operable to provide functionality (e.g., control functionality) for the system 200 or the host device 205. The processor 225 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the processor 225 may be an example of a central processing unit (CPU), a graphics processing unit (GPU), a general purpose GPU (GPGPU), or an SoC, among other examples. In some examples, the external memory controller 220 may be implemented by or be a part of the processor 225.

The BIOS component 230 may be a software component that includes a BIOS operated as firmware, which may initialize and run various hardware components of the system 200 or the host device 205. The BIOS component 230 may also manage data flow between the processor 225 and the various components of the system 200 or the host device 205. The BIOS component 230 may include instructions (e.g., a program, software) stored in one or more of read-only memory (ROM), flash memory, or other non-volatile memory.

In some examples, the system 200 or the host device 205 may include an input component, an output component, or both. An input component may represent a device or signal external to the system 200 that provides information (e.g., signals, data) to the system 200 or its components. In some examples, and input component may include an interface (e.g., a user interface or an interface between other devices). In some examples, an input component may be a peripheral that interfaces with system 200 via one or more peripheral components or may be managed by an I/O controller. An output component may represent a device or signal external to the system 200 operable to receive an output from the system 200 or any of its components. Examples of an output component may include a display, audio speakers, a printing device, another processor on a printed circuit board, and others. In some examples, an output may be a peripheral that interfaces with the system 200 via one or more peripheral components or may be managed by an I/O controller.

The memory device 210 may include a device memory controller 255 and one or more memory dies 260 (e.g., memory chips) to support a capacity (e.g., a desired capacity, a specified capacity) for data storage. Each memory die 260 (e.g., memory die 260-*a*, memory die 260-*b*, memory die 260-N) may include a local memory controller 265 (e.g., local memory controller 265-*a*, local memory controller 265-*b*, local memory controller 265-N) and a memory array 270 (e.g., memory array 270-*a*, memory array 270-*b*, memory array 270-N). A memory array 270 may be a collection (e.g., one or more grids, one or more banks, one or more tiles, one or more sections) of memory cells, with each memory cell being operable to store one or more bits of data. A memory device 210 including two or more memory dies 260 may be referred to as a multi-die memory or a multi-die package or a multi-chip memory or a multi-chip package.

The device memory controller 255 may include components (e.g., circuitry, logic) operable to control operation of the memory device 210. The device memory controller 255 may include hardware, firmware, or instructions that enable the memory device 210 to perform various operations and may be operable to receive, transmit, or execute commands, data, or control information related to the components of the memory device 210. The device memory controller 255 may be operable to communicate with one or more of the external memory controller 220, the one or more memory dies 260, or the processor 225. In some examples, the device memory controller 255 may control operation of the memory device 210 described herein in conjunction with the local memory controller 265 of the memory die 260.

A local memory controller 265 (e.g., local to a memory die 260) may include components (e.g., circuitry, logic) operable to control operation of the memory die 260. In some examples, a local memory controller 265 may be operable to communicate (e.g., receive or transmit data or commands or both) with the device memory controller 255. In some examples, a memory device 210 may not include a device memory controller 255, and a local memory controller 265 or the external memory controller 220 may perform various functions described herein. As such, a local memory controller 265 may be operable to communicate with the device memory controller 255, with other local memory controllers 265, or directly with the external memory controller 220, or the processor 225, or any combination thereof. Examples of components that may be included in the device memory controller 255 or the local memory controllers 265 or both may include receivers for receiving signals (e.g., from the external memory controller 220), transmitters for transmitting signals (e.g., to the external memory controller 220), decoders for decoding or demodulating received signals, encoders for encoding or modulating signals to be transmitted, or various other components operable for supporting described operations of the device memory controller 255 or local memory controller 265 or both.

The external memory controller 220 may be operable to enable communication of information (e.g., data, commands, or both) between components of the system 200 (e.g., between components of the host device 205, such as the processor 225, and the memory device 210). The external memory controller 220 may process (e.g., convert, translate) communications exchanged between the components of the host device 205 and the memory device 210. In some examples, the external memory controller 220, or other component of the system 200 or the host device 205, or its functions described herein, may be implemented by the processor 225. For example, the external memory controller 220 may be hardware, firmware, or software, or some combination thereof implemented by the processor 225 or other component of the system 200 or the host device 205. Although the external memory controller 220 is depicted as being external to the memory device 210, in some examples, the external memory controller 220, or its functions described herein, may be implemented by one or more components of a memory device 210 (e.g., a device memory controller 255, a local memory controller 265) or vice versa.

The components of the host device 205 may exchange information with the memory device 210 using one or more channels 215. The channels 215 may be operable to support communications between the external memory controller 220 and the memory device 210. Each channel 215 may be an example of a transmission medium that carries information between the host device 205 and the memory device 210. Each channel 215 may include one or more signal paths (e.g., a transmission medium, a conductor) between terminals associated with the components of the system 200. A signal path may be an example of a conductive path operable to carry a signal. For example, a channel 215 may be associated with a first terminal (e.g., including one or more pins, including one or more pads) at the host device 205 and a second terminal at the memory device 210. A terminal may be an example of a conductive input or output point of a device of the system 200, and a terminal may be operable to act as part of a channel.

Channels 215 (and associated signal paths and terminals) may be dedicated to communicating one or more types of information. For example, the channels 215 may include one or more command and address (CA) channels 286, one or more clock signal (CK) channels 288, one or more data (DQ) channels 290, one or more other channels 292, or any combination thereof. In some examples, signaling may be communicated over the channels 215 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, the memory device 210 may include one or more secure storage portions for storing secure data. The secure storage portions may be configured as one or more memory dies 260. In some examples, the memory device 210 may include a cryptographic engine capable of generating cryptographic keys for encrypting and decrypting information stored within the secure storage portion of the memory device 210. The cryptographic engine may also perform other functions associated with the memory device 210, such as generating and/or processing encrypted signatures, encrypted command signaling, encrypted request signaling, encrypted data signaling, encrypted responses, etc.

According to various examples, the memory device 210 may use one or more cryptographic engines to authenticate the identity of the host device 205 or other components that may require access to data stored in the secure storage portion. In some examples, the cryptographic engine may perform the authentication process using one or more cryptographic keys. In some examples, the cryptographic engine may generate or store multiple cryptographic keys, and associate each cryptographic key with different portions of the memory device 210. The cryptographic engine may also associate the cryptographic keys with different components or external entities authorized to access the memory device 210.

In some examples, the memory device 210 may be part of a component within a device (e.g., vehicle) as described in connection with FIG. 1. In other examples, the memory device 210 may be included in a memory system, such as memory system 115, which may include one or more types of memory devices (e.g., volatile, non-volatile, etc.) including memory device 210. Thus, the device calibration may be stored in a secure storage portion of the memory device 210.

According to the disclosed examples, as described in greater detail below, the memory device 210 may be incorporated in a device used for implementing secure calibration using a cloud-based authentication platform. A secure (e.g., signed) test authorization request may be received by the device and communicated to the memory device 210. The memory device 210 may use its cryptographic engine to decrypt and access data contained in the test authorization request. The memory device 210 may access the calibration from the secure storage portion so that the compliance test may be performed. In some examples, the memory device 210 may be configured to determine the results of the compliance test. In other examples, the memory device 210 may be configured to communicate, via the device, results of the compliance test to the authentication platform for analysis and verification. A compliance certificate indicating the status (e.g., pass, fail, etc.) of the device may subsequently be generated using various methods.

In addition to applicability in memory systems described herein, techniques for certification of device calibrations may be generally implemented to improve security and/or authentication features of various electronic devices and systems. As the use of electronic devices for handling private, user, or other sensitive information has become even more widespread, electronic devices and systems have become the target of increasingly frequent and sophisticated attacks. Further, unauthorized access or modification of data in security-critical devices such as vehicles, healthcare devices, and others may be especially concerning. Implementing the techniques described herein may improve security of calibration information stored on electronic devices included in automobiles and systems by providing a secure cloud-based platform to authenticate certification of calibrations associated with the devices, and may prevent or mitigate unauthorized access to the calibration information, among other benefits.

Figure 3:
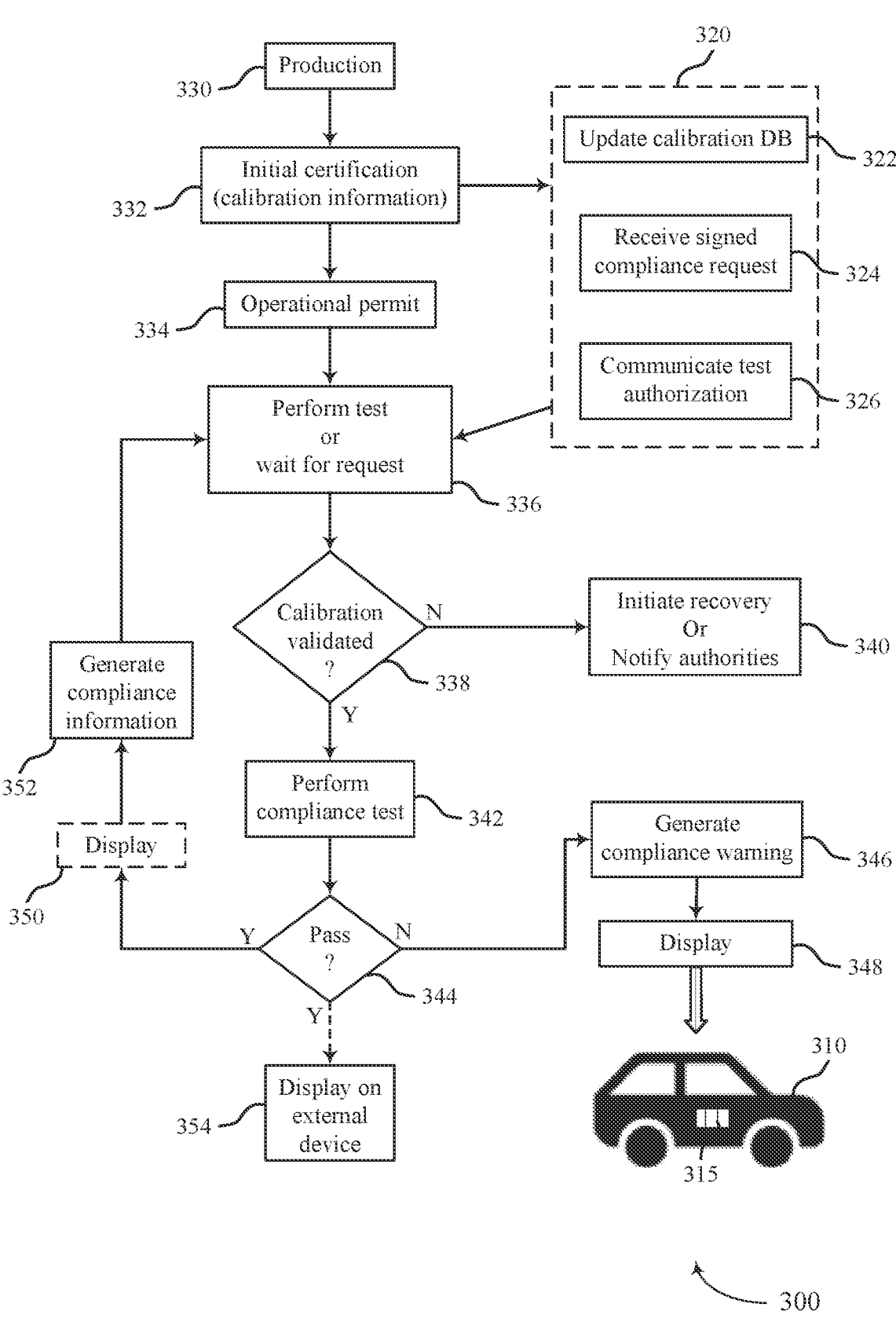
FIG. 3 shows an example of a process that supports the certification of device calibrations in accordance with examples as disclosed herein.

FIG. 3 shows an example of a process 300 that supports certification of device calibrations in accordance with examples as disclosed herein. According to the illustrated example, the process may be performed in conjunction with the various devices such as a vehicle 310 having a memory system 315 and an authentication platform 320. Other devices may include, for example, a manufacturing facility, networking facility, government facility, Internet of Things (IoT) devices, etc. In some examples, the vehicle 310 may include a memory system 315 (which may be or include a memory device such as the memory device 210) in addition to various communication, mechanical, and electronic components. The vehicle 310 may further include various onboard storage and diagnostic components in addition to or in place of the memory system 315. In some examples, the memory system 315 may be an example of or include a memory device 210 as previously described with respect to FIG. 2. For example, the memory system 315 may include one or more types of memory devices (e.g., RAM, SRAM, ROM, DRAM, SDRAM, FORAM, PCM, NOR, NAND, and others) as well as the memory device 210. The memory system 315 may be a secure storage device configured to restrict or prevent unauthorized access to secure data contained therein. According to the disclosed examples, the memory system 315 may include one or more secure storage portions for storing the secure data. The memory system 315 may also include one or more additional storage portions for storing non-secure data.

In some examples, entities such as the authentication platform 320 may require access to the secure data stored in memory system 315. The memory system 315 may be configured to authenticate the identity of the authentication platform 320 based upon one or more cryptographic keys associated with authentication platform 320, the memory system 315, or both. In some examples, the memory system 315 may include a cryptographic engine capable of generating cryptographic keys for encrypting and decrypting information stored within the secure storage portion of the memory system 315. The cryptographic engine may perform other functions associated with the memory system, such as generating and/or processing encrypted signatures, encrypted command signaling, encrypted request signaling, encrypted data signaling, encrypted responses, etc. The cryptographic keys may also be used to access information communicated with the authentication platform 320. In some examples, the cryptographic engine may generate multiple cryptographic keys, and associate each cryptographic key with different portions of the memory system 315. The cryptographic engine may also associate the cryptographic keys with different entities (e.g., authentication platform 320) authorized to access the memory system 315.

In some examples, the cryptographic engine may be used to authenticate devices associated with the memory system 315 or external entities requesting access to the memory system 315. For example, the memory system 315 may receive messages (e.g., test authorization) from the authentication platform 320. The messages may be signed using a cryptographic key corresponding to or shared with a particular cryptographic key generated by the cryptographic engine. In some examples, the cryptographic key may be communicated to the memory system 315 and stored in the cryptographic engine, or the secure storage portion, and/or other locations.

In some examples, the authentication platform 320 may be configured as a cloud-based system capable of communicating with the vehicle 310 using one or more communication channels. In some examples, the communication channel may be wired and require a physical connection to the vehicle 310. In other examples, the communication channel may be based on various wireless communication standards. For example, the communication channel may operate over a cellular network, a satellite network, etc. In some examples, the device may include a telematics component capable of receiving over the air (OTA) signals containing instructions, data, etc. The authentication platform 320 may include a calibration database 322 for storing calibration information associated with different vehicles 310 (or devices). In some examples, the calibration database 322 may be updated with calibration information associated with devices that have been newly introduced. The calibration database 322 may also be updated with any changes associated with the calibration information of existing devices.

The authentication platform 320 may utilize the communication channel to communicate with one or more compliance devices. In some examples, the compliance device may be an authoritative device that is associated with vendors, compliance agencies, licensing agencies, etc. responsible for certifying and/or monitoring a particular status of the vehicle 310. The compliance agency may also be a fleet manager responsible for operation of multiple vehicles 310. In other examples, the compliance device may be a supervisory personnel or overseeing entity for a production facility, data warehousing facility, distribution facility, etc. The authentication platform 320 may include one or more encryption engines which can be used to authenticate the identity of the compliance devices 324. In some examples, the authentication platform 320 may verify the identity of the compliance device 324 using a public key and/or a private key associated with the compliance device.

According to the disclosed examples, the authentication platform 320 may receive a digitally-signed compliance request from the compliance device at 324. The authentication platform 320 may apply various encryption techniques to decrypt and/or verify the identity of the compliance device. In some examples, the authentication platform 320 may store cryptographic keys (e.g., public and private) that may be used to decrypt and access contents of the compliance request by decrypting the information received over the communication channel. The authentication platform 320 may further communicate a test authorization to the vehicle 310 based on confirming the identity of the compliance device, as indicated at 326. For example, the compliance device may communicate the signed request based on the vehicle 310 satisfying certain dates. In one example, the signed request may be communicated based on an approaching due date for emission tests of the vehicle 310.

According to the disclosed examples, a device such as the vehicle 310 or included within vehicle 310 may be produced at a factory or production center at 330. During the production process, or immediately following the production process, an initial certification is stored at 332. In some examples, the initial certification may be stored within the device. In some examples, the initial certification (e.g., calibration information) may be communicated to the authentication platform 320 using the communication channel. The authentication platform 320 may use the initial certification to update its calibration database 322. For example, the initial certification may be used to create a new record in the calibration database 322. The authentication platform 320 may update an existing record in the calibration database 322 when the certification is associated with an existing device.

According to some examples, the initial certification may correspond to initial calibration information for the vehicle 310. The calibration information may, for example, correspond to software aspects or values that may be used to control or dictate operation of certain hardware components (e.g., electronics, mechanical, electro-mechanical components, etc.) of the vehicle 310. The calibration information may include one or more parameters usable for controlling components associated with the device while performing the compliance test. In other examples, the calibration information may include operating conditions for performing the compliance test. The operating conditions may specify when and where the compliance test should be performed. For example, if the compliance test corresponds to the emission status of the vehicle 310, the calibration information may specify whether the compliance test (e.g., emissions test) should be conducted while the vehicle is operating in normal traffic, highway traffic, or idling. The calibration information may further specify a combination of compliance tests using one or more operating conditions for the vehicle 310.

In some examples, the calibration information may be stored in the memory system 315 of the vehicle 310 in a secure format and/or in a secure location. The memory system 315 may include, for example, a secure storage portion and a cryptographic engine. The cryptographic engine may be used, in part, to encrypt the calibration information prior to storage within the secure storage portion of the memory system 315. At 334, an operational permit may be generated. In some examples, the operational permit may correspond to a compliance certificate or other information indicative of the vehicle's compliance status.

At 336, an indication may be provided to initiate a test (e.g., a random test, a periodic test, etc.) or wait for a request to initiate a test, such as a compliance test. In some examples, the request may be received from the authentication platform 320 based on receiving a signed compliance request and verifying the identity of a compliance device. In some examples, the memory system 315 may be configured to determine random intervals for initiating the tests. In other examples, the memory system 315 may be configured to initiate the tests at regular or semi-regular intervals. For example, the compliance test may be initiated based on usage (e.g., vehicle starts, device initialization, device reboot, etc.), usage time (e.g., miles driven, time spent using the device, etc.), registration renewal, software update/upgrade, insurance renewal, etc.

At 338, the calibration information is validated. In some examples, the memory system 315 may be configured to test the integrity of the data associated with the calibration information. When the calibration information is determined to be invalid, a recovery or notification process may be initiated at 340. For example, the memory system 315 may initiate a recovery operation by accessing a copy of the initial certification (i.e., calibration information) that may be stored in a recovery portion thereof. In some examples, the recovery portion of the memory system may contain authoritative calibration information for the vehicle 310. In other examples, the initial certification may be the same as the authoritative calibration information. The copy of the initial certification may then be stored in the secure storage portion of the memory system 315. Thus, the invalid calibration information may be overwritten with the recovered initial certification.

In other examples, the vehicle 310 (or device) may communicate information to the authentication platform 320 to indicate that the current calibration information is no longer valid. The authentication platform 320 may communicate an indication to the memory system 315 specifying that the recovery portion should be accessed. In some examples, the authentication platform 320 may communicate a unique read command to access the recovery portion of the memory system 315. The authentication platform 320 may further communicate a command to store the initial certification from the recovery portion into the secure storage portion of the memory system 315. As previously discussed, an initial certification is stored in the memory system 315 during the production process at 332. The initial certification is also communicated to the authentication platform 320. According to at least one example, the authentication platform 320 may communicate the initial certification for the device and provide an instruction to store the initial certification in the secure storage portion of the memory system 315. In some examples, the memory system 315 may communicate an indication, to the authentication platform 320, that certain components (e.g., electronic control unit, media access control interface, etc.) have been damaged and/or replaced. The authentication entity 320 may subsequently communicate the initial certification for storage in the secure storage area of the memory system 315.

In some examples, the memory system may initiate a notification process with authorities (or authoritative agencies). In some examples, the authoritative agency may be associated with the compliance device. The memory system 315 may be configured to notify the authoritative agency directly over the communication channel or indirectly via the authentication platform 320. For example, upon determining that the calibration information is invalid, the memory system 315 may communicate a request to the authentication platform 320 to notify the authoritative agency.

According to various examples, the memory system 315 may perform various tests as part of or in addition to the validation performed at 338. The additional tests may be used to determine whether a recovery operation should be initiated or the authoritative agency contacted. In some examples, the memory system 315 may determine that the calibration is invalid due to an error associated with physical damage, component degradation, etc. Thus, the memory system 315 may initiate recovery of the initial certification from the recovery portion. In other examples, the memory system 315 may determine that the error is associated with tampering resulting in unauthorized access to and/or modification (attempted or actual) of the calibration information. Thus, the memory system 315 may initiate the notification process.

If the calibration is determined to be valid at 338, then a compliance test is performed at 342. In some examples, the memory system 315 may be configured to control hardware and/or software components of the vehicle 310 during the compliance test (e.g., compliance test). In some examples, the memory system 315 may perform the compliance test while the vehicle 310 is idling. In some examples, the memory system 315 may perform the compliance test while the vehicle 310 is involved in highway traffic or city traffic. For example, the memory system 315 may monitor the speed at which the vehicle 310 is traveling in order to determine when the compliance test should be performed. In some examples, the memory system 315 may be configured to apply various artificial intelligence and/or machine learning techniques to predict routes traveled by the vehicle 310 in order to determine when the compliance test should be performed.

At 344, it is determined whether the vehicle 310 has passed the compliance test. In some examples, the memory system 315 may be configured to analyze information obtained during the compliance tests and perform a comparison with a portion, or entirety, of the calibration information to verify compliance. In other examples, the vehicle 310 may include onboard diagnostic hardware and/or software capable of analyzing the results of the compliance tests. According to at least one example, results of the compliance test may be communicated to the authentication platform 320 for verification. In some instances, the device (e.g., vehicle 310) may not have independent abilities to communicate information to external entities (e.g., no cellular or network service) such as the authentication platform 320. In such examples, the device may be configured to perform the compliance test in accordance with specified conditions and communicate the results at a time when connectivity (e.g., wi-fi, or wired) becomes available.

If the vehicle 310 does not pass the compliance test, a compliance warning may be generated at 346. In some examples, the compliance warning may be generated by the memory system 315. For example, the memory system 315 may be configured to communicate a signal to one or more components of the vehicle 310 in order to produce the compliance warning. In some examples, the compliance warning may be audible, visible, physical, or any combination thereof. At 348, the compliance warning may be displayed on a device, such as within the vehicle 310. The compliance warning may be in the form of a visible indication on the dashboard, infotainment system, etc.

If the compliance test is successful, then at 350, an indication may be displayed in the vehicle 310. The indication may be displayed on the dashboard, infotainment system display, etc. In some examples, successful completion of the compliance test may cause information indicative thereof to be displayed on a device, such as an external device, at 354. In some examples, the external device may be a mobile phone, tablet, laptop, display unit, etc. At 352, a compliance certificate may be generated or received. In some examples, the memory system 315 may be configured to generate a new, or updated, compliance certificate. In other examples, the memory system 315 may be configured to communicate an indication to the authentication platform 320 that the compliance test is successful. The authentication platform 320 may subsequently communicate the compliance certificate to the memory system 315. In some examples, the compliance certificate received from the authentication platform may be stored in the secure storage portion of the memory system 315. According to various examples, control may return to 336 to initiate a random test or await reception of a new request.

Figure 4:
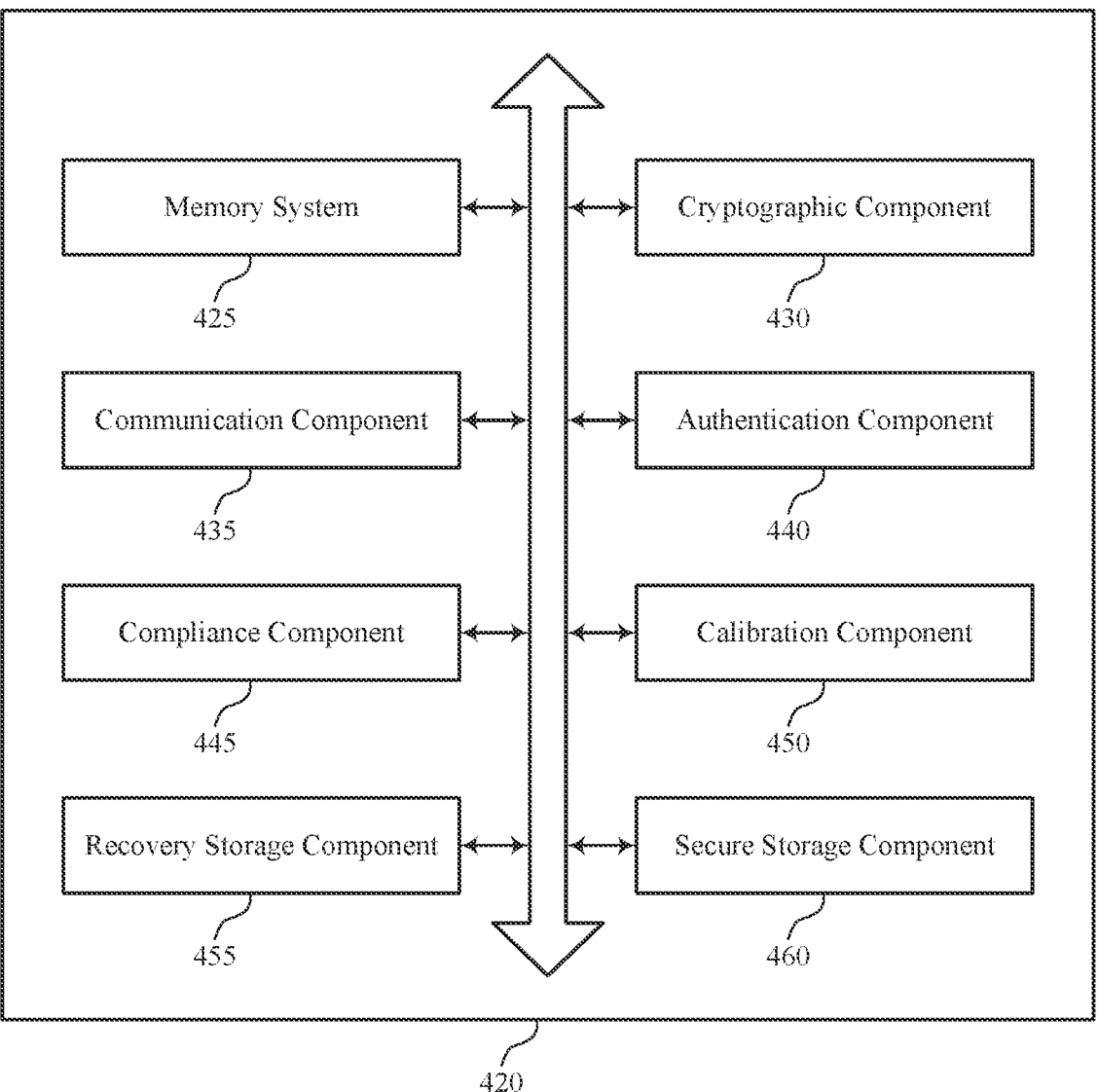
FIG. 4 shows a block diagram of a memory device that supports the certification of device calibrations in accor-dance with examples as disclosed herein.

FIG. 4 shows a block diagram 400 of a memory device 420 that supports certification of device calibrations in accordance with examples as disclosed herein. The memory device 420 may be an example of aspects of a memory device as described with reference to FIGS. 2 through 3. The memory device 420, or various components thereof, may be an example of means for performing various aspects of certification of device calibrations as described herein. For example, the memory device 420 may include a memory system 425, a cryptographic component 430, a communication component 435, an authentication component 440, a compliance component 445, an authentication component 450, a calibration component 455, a recovery storage component 460, a secure storage component 460, or any combination thereof. Each of these components may communicate, directly or indirectly, with one another (e.g., via one or more buses).

The memory system 425 may be configured as or otherwise support a means for storing, in a memory system including a cryptographic engine, calibration information in an encrypted format associated with the cryptographic engine, the calibration information associated with a device including the memory system. The cryptographic component 430 may be configured as or otherwise support a means for receiving, from an authentication platform via a wireless communication channel coupled with the memory system, a signed request associated with performing a compliance test for the device based at least in part on the calibration information. In some examples, the memory system 425 may be configured as or otherwise support a means for communicating, to the authentication platform via the wireless communication channel, compliance information based at least in part on receiving the signed request associated with performing a compliance test, the compliance information including a result of performing the compliance test for the device.

In some examples, the memory system 425 may be configured as or otherwise support a means for receiving, at the memory system, a certificate containing information indicative of a compliance status for the device, based at least in part on communicating the compliance information.

In some examples, the cryptographic component 430 may be configured as or otherwise support a means for encrypting, using the cryptographic engine of the memory device, the calibration information into the encrypted format.

In some examples, to support calibration information, the calibration component 455 may be configured as or otherwise support a means for one or more parameters for controlling components associated with the memory device to perform the compliance test.

In some examples, to support calibration information, the calibration component 455 may be configured as or otherwise support a means for operating conditions for performing the compliance test.

In some examples, the recovery storage component 460 may be configured as or otherwise support a means for storing, in a recovery portion of the memory system, authoritative calibration information for the device, where the authoritative calibration information is stored during a manufacturing process or a distribution process.

In some examples, the secure storage component 465 may be configured as or otherwise support a means for determining an error in the calibration information stored in a secure storage portion of the memory system. In some examples, the recovery storage component 460 may be configured as or otherwise support a means for referencing, from the recovery portion of the memory system, the authoritative calibration information for the device. In some examples, the secure storage component 460 may be configured as or otherwise support a means for storing, in the secure storage portion of the memory system, the referenced authoritative calibration information, where the authoritative calibration information is usable as calibration information to perform the compliance test.

In some examples, the memory system 425 may be configured as or otherwise support a means for determining that the error is associated with tampering, and communicating, to an authoritative agency, an indication of tampering associated with the calibration information.

In some examples, to support determining the error, the memory system 425 may be configured as or otherwise support a means for determining that the error is associated with physical damage or component degradation.

The communication component 435 may be configured as or otherwise support a means for receiving, from a compliance device, a request to obtain compliance information for a device. The authentication component 440 may be configured as or otherwise support a means for verifying an identity of the compliance device based at least in part on receiving the request. In some examples, the authentication component 440 may be configured as or otherwise support a means for generating a signed request for performing a compliance test for the device based at least in part on verifying the identity of the device. In some examples, the communication component 435 may be configured as or otherwise support a means for communicating, to the device via a communication channel, the signed request for performing the compliance test. In some examples, the communication component 435 may be configured as or otherwise support a means for receiving, from the device via the communication channel, compliance information based at least in part on communicating the signed request to implement a compliance test, the compliance information including a result of the compliance test for the device. In some examples, the communication component 435 may be configured as or otherwise support a means for communicating the compliance information for the device to the compliance device based at least in part on receiving the compliance information.

In some examples, the communication component 435 may be configured as or otherwise support a means for receiving, from a compliance device, a certificate containing information indicative of a compliance status for the device, based at least in part on communicating the compliance information. In some examples, the communication component 435 may be configured as or otherwise support a means for communicating the certificate to the device.

In some examples, verifying an identity of the compliance device is based at least in part on at least one of a public key associated with the compliance device or a private key associated with the compliance device.

In some examples, the memory system 425 may be configured as or otherwise support a means for a memory system of the device including calibration information associated with the device and a cryptographic engine for encrypting the calibration information.

The compliance component 445 may be configured as or otherwise support a means for receiving, from a compliance device, a request to obtain compliance information for a device. In some examples, the authentication component 440 may be configured as or otherwise support a means for verifying, at an authentication platform, an identity of the compliance device based at least in part on receiving the request. The authentication component 450 may be configured as or otherwise support a means for communicating, to the compliance device, a signed request for performing a compliance test for the device based at least in part on receiving the request to obtain compliance information. In some examples, the compliance component 445 may be configured as or otherwise support a means for transmitting, from the compliance device to a memory system associated with the device via a communication channel, the signed request for performing a compliance test based at least in part on communicating the signed request, where the memory system includes calibration information associated with the device and a cryptographic engine for encrypting the calibration information. In some examples, the memory system 425 may be configured as or otherwise support a means for performing the compliance test for the device based at least in part on the signed request and the calibration information. In some examples, the compliance component 445 may be configured as or otherwise support a means for receiving, by the compliance device via the communication channel, compliance information for the device based at least in part on transmitting the signed request, the compliance information including a result of the compliance test for the device.

In some examples, the compliance component 445 may be configured as or otherwise support a means for determining, by the compliance device, a compliance status for the device based at least in part on receiving the compliance information.

In some examples, the compliance component 445 may be configured as or otherwise support a means for communicating a certificate containing information indicative of the compliance status for the device.

FIG. 5 shows a flowchart illustrating a method 500 that supports certification of device calibrations in accordance with examples as disclosed herein. The operations of method 500 may be implemented by a memory device or its components as described herein. For example, the operations of method 500 may be performed by a memory device as described with reference to FIGS. 2 through 4. In some examples, a memory device may execute a set of instructions to control the functional elements of the device to perform the described functions. Additionally, or alternatively, the memory device may perform aspects of the described functions using special-purpose hardware.

At 505, the method may include storing, in a memory system including a cryptographic engine, calibration information in an encrypted format associated with the cryptographic engine, the calibration information associated with a device including the memory system. The operations of 505 may be performed in accordance with examples as disclosed herein. In some examples, aspects of the operations of 505 may be performed by a memory system 425 as described with reference to FIG. 4.

At 510, the method may include receiving, from an authentication platform via a wireless communication channel coupled with the memory system, a signed request associated with performing a compliance test for the device based at least in part on the calibration information. The operations of 510 may be performed in accordance with examples as disclosed herein. In some examples, aspects of the operations of 510 may be performed by a cryptographic component 430 as described with reference to FIG. 4.

At 515, the method may include communicating, to the authentication platform via the wireless communication channel, compliance information based at least in part on receiving the signed request associated with performing a compliance test, the compliance information including a result of performing the compliance test for the device. The operations of 515 may be performed in accordance with examples as disclosed herein. In some examples, aspects of the operations of 515 may be performed by a memory system 425 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for storing, in a memory system including a cryptographic engine, calibration information in an encrypted format associated with the cryptographic engine, the calibration information associated with a device including the memory system; receiving, from an authentication platform via a wireless communication channel coupled with the memory system, a signed request associated with performing a compliance test for the device based at least in part on the calibration information; and communicating, to the authentication platform via the wireless communication channel, compliance information based at least in part on receiving the signed request associated with performing a compliance test, the compliance information including a result of performing the compliance test for the device.

Aspect 2: The method, apparatus, or non-transitory computer-readable medium of aspect 1, further including operations, features, circuitry, logic, means, or instructions, or any combination thereof for receiving, at the memory system, a certificate containing information indicative of a compliance status for the device, based at least in part on communicating the compliance information.

Aspect 3: The method, apparatus, or non-transitory computer-readable medium of any of aspects 1 through 2, further including operations, features, circuitry, logic, means, or instructions, or any combination thereof for encrypting, using the cryptographic engine of the memory device, the calibration information into the encrypted format.

Aspect 4: The method, apparatus, or non-transitory computer-readable medium of any of aspects 1 through 3, where the calibration information includes operations, features, circuitry, logic, means, or instructions, or any combination thereof for one or more parameters for controlling components associated with the memory device to perform the compliance test.

Aspect 5: The method, apparatus, or non-transitory computer-readable medium of any of aspects 1 through 4, where the calibration information includes operations, features, circuitry, logic, means, or instructions, or any combination thereof for operating conditions for performing the compliance test.

Aspect 6: The method, apparatus, or non-transitory computer-readable medium of any of aspects 1 through 5, further including operations, features, circuitry, logic, means, or instructions, or any combination thereof for storing, in a recovery portion of the memory system, authoritative calibration information for the device, where the authoritative calibration information is stored during a manufacturing process or a distribution process.

Aspect 7: The method, apparatus, or non-transitory computer-readable medium of aspect 6, further including operations, features, circuitry, logic, means, or instructions, or any combination thereof for determining an error in the calibration information stored in a secure storage portion of the memory system; referencing, from the recovery portion of the memory system, the authoritative calibration information for the device; and storing, in the secure storage portion of the memory system, the referenced authoritative calibration information, where the authoritative calibration information is usable as calibration information to perform the compliance test.

Aspect 8: The method, apparatus, or non-transitory computer-readable medium of aspect 7, where determining that the error is associated with tampering, and the method, apparatuses, and non-transitory computer-readable medium further includes operations, features, circuitry, logic, means, or instructions, or any combination thereof for communicating, to an authoritative agency, an indication of tampering associated with the calibration information.

Aspect 9: The method, apparatus, or non-transitory computer-readable medium of any of aspects 7 through 8, where determining the error includes operations, features, circuitry, logic, means, or instructions, or any combination thereof for determining that the error is associated with physical damage or component degradation.

FIG. 6 shows a flowchart illustrating a method 600 that supports certification of device calibrations in accordance with examples as disclosed herein. The operations of method 600 may be implemented by a memory device or its components as described herein. For example, the operations of method 600 may be performed by a memory device as described with reference to FIGS. 2 through 4. In some examples, a memory device may execute a set of instructions to control the functional elements of the device to perform the described functions. Additionally, or alternatively, the memory device may perform aspects of the described functions using special-purpose hardware.

At 605, the method may include receiving, from a compliance device, a request to obtain compliance information for a device. The operations of 605 may be performed in accordance with examples as disclosed herein. In some examples, aspects of the operations of 605 may be performed by a communication component 435 as described with reference to FIG. 4.

At 610, the method may include verifying an identity of the compliance device based at least in part on receiving the request. The operations of 610 may be performed in accordance with examples as disclosed herein. In some examples, aspects of the operations of 610 may be performed by an authentication component 440 as described with reference to FIG. 4.

At 615, the method may include generating a signed request for performing a compliance test for the device based at least in part on verifying the identity of the device. The operations of 615 may be performed in accordance with examples as disclosed herein. In some examples, aspects of the operations of 615 may be performed by an authentication component 440 as described with reference to FIG. 4.

At 620, the method may include communicating, to the device via a communication channel, the signed request for performing the compliance test. The operations of 620 may be performed in accordance with examples as disclosed herein. In some examples, aspects of the operations of 620 may be performed by a communication component 435 as described with reference to FIG. 4.

At 625, the method may include receiving, from the device via the communication channel, compliance information based at least in part on communicating the signed request to implement a compliance test, the compliance information including a result of the compliance test for the device. The operations of 625 may be performed in accordance with examples as disclosed herein. In some examples, aspects of the operations of 625 may be performed by a communication component 435 as described with reference to FIG. 4.

At 630, the method may include communicating the compliance information for the device to the compliance device based at least in part on receiving the compliance information. The operations of 630 may be performed in accordance with examples as disclosed herein. In some examples, aspects of the operations of 630 may be performed by a communication component 435 as described with reference to FIG. 4.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 10: A method, apparatus, or non-transitory computer-readable medium including operations, features, circuitry, logic, means, or instructions, or any combination thereof for receiving, from a compliance device, a request to obtain compliance information for a device; verifying an identity of the compliance device based at least in part on receiving the request; generating a signed request for performing a compliance test for the device based at least in part on verifying the identity of the device; communicating, to the device via a communication channel, the signed request for performing the compliance test; receiving, from the device via the communication channel, compliance information based at least in part on communicating the signed request to implement a compliance test, the compliance information including a result of the compliance test for the device; and communicating the compliance information for the device to the compliance device based at least in part on receiving the compliance information.

Aspect 11: The method, apparatus, or non-transitory computer-readable medium of aspect 10, further including operations, features, circuitry, logic, means, or instructions, or any combination thereof for receiving, from a compliance device, a certificate containing information indicative of a compliance status for the device, based at least in part on communicating the compliance information and communicating the certificate to the device.

Aspect 12: The method, apparatus, or non-transitory computer-readable medium of any of aspects 10 through 11, where verifying an identity of the compliance device is based at least in part on at least one of a public key associated with the compliance device or a private key associated with the compliance device.

Aspect 13: The method, apparatus, or non-transitory computer-readable medium of any of aspects 10 through 12, further including operations, features, circuitry, logic, means, or instructions, or any combination thereof for a memory system of the device including calibration information associated with the device and a cryptographic engine for encrypting the calibration information.

FIG. 7 shows a flowchart illustrating a method 700 that supports certification of device calibrations in accordance with examples as disclosed herein. The operations of method 700 may be implemented by a memory device or its components as described herein. For example, the operations of method 700 may be performed by a memory device as described with reference to FIGS. 2 through 4. In some examples, a memory device may execute a set of instructions to control the functional elements of the device to perform the described functions. Additionally, or alternatively, the memory device may perform aspects of the described functions using special-purpose hardware.

At 705, the method may include receiving, from a compliance device, a request to obtain compliance information for a device. The operations of 705 may be performed in accordance with examples as disclosed herein. In some examples, aspects of the operations of 705 may be performed by a compliance component 445 as described with reference to FIG. 4.

At 710, the method may include verifying, at an authentication platform, an identity of the compliance device based at least in part on receiving the request. The operations of 710 may be performed in accordance with examples as disclosed herein. In some examples, aspects of the operations of 710 may be performed by an authentication component 440 as described with reference to FIG. 4.

At 715, the method may include communicating, to the compliance device, a signed request for performing a compliance test for the device based at least in part on receiving the request to obtain compliance information. The operations of 715 may be performed in accordance with examples as disclosed herein. In some examples, aspects of the operations of 715 may be performed by an authentication component 450 as described with reference to FIG. 4.

At 720, the method may include transmitting, from the compliance device to a memory system associated with the device via a communication channel, the signed request for performing a compliance test based at least in part on communicating the signed request, where the memory system includes calibration information associated with the device and a cryptographic engine for encrypting the calibration information. The operations of 720 may be performed in accordance with examples as disclosed herein. In some examples, aspects of the operations of 720 may be performed by a compliance component 445 as described with reference to FIG. 4.

At 725, the method may include performing the compliance test for the device based at least in part on the signed request and the calibration information. The operations of 725 may be performed in accordance with examples as disclosed herein. In some examples, aspects of the operations of 725 may be performed by a memory system 425 as described with reference to FIG. 4.

At 730, the method may include receiving, by the compliance device via the communication channel, compliance information for the device based at least in part on transmitting the signed request, the compliance information including a result of the compliance test for the device. The operations of 730 may be performed in accordance with examples as disclosed herein. In some examples, aspects of the operations of 730 may be performed by a compliance component 445 as described with reference to FIG. 4.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 14: A method, apparatus, or non-transitory computer-readable medium including operations, features, circuitry, logic, means, or instructions, or any combination thereof for receiving, from a compliance device, a request to obtain compliance information for a device; verifying, at an authentication platform, an identity of the compliance device based at least in part on receiving the request; communicating, to the compliance device, a signed request for performing a compliance test for the device based at least in part on receiving the request to obtain compliance information; transmitting, from the compliance device to a memory system associated with the device via a communication channel, the signed request for performing a compliance test based at least in part on communicating the signed request, where the memory system includes calibration information associated with the device and a cryptographic engine for encrypting the calibration information; performing the compliance test for the device based at least in part on the signed request and the calibration information; and receiving, by the compliance device via the communication channel, compliance information for the device based at least in part on transmitting the signed request, the compliance information including a result of the compliance test for the device.

Aspect 15: The method, apparatus, or non-transitory computer-readable medium of aspect 14, further including operations, features, circuitry, logic, means, or instructions, or any combination thereof for determining, by the compliance device, a compliance status for the device based at least in part on receiving the compliance information.

Aspect 16: The method, apparatus, or non-transitory computer-readable medium of aspect 15, further including operations, features, circuitry, logic, means, or instructions, or any combination thereof for communicating a certificate containing information indicative of the compliance status for the device.

It should be noted that the methods described herein describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorus, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for operating a memory system, comprising:

storing, in the memory system comprising a cryptographic engine, calibration information in an encrypted format, the calibration information for a device including the memory system;

receiving, at the memory system from an authentication platform via a wireless communication channel coupled with the memory system, a signed request for performing a compliance test for the device based at least in part on the calibration information; and communicating, from the memory system to the authentication platform via the wireless communication channel, compliance information based at least in part on receiving the signed request for performing the compliance test for the device, wherein a result of performing the compliance test for the device is based at least in part on decrypting the encrypted format of the calibration information using the cryptographic engine.

2. The method of claim 1, further comprising:

receiving, at the memory system, a certificate containing information indicative of a compliance status for the device, based at least in part on communicating the compliance information.

3. The method of claim 1, further comprising:

encrypting, using the cryptographic engine of the memory system, the calibration information into the encrypted format.

4. The method of claim 1, wherein the calibration information comprises:

one or more parameters for controlling components of the memory system to perform the compliance test.

5. The method of claim 1, wherein the calibration information comprises:

operating conditions for performing the compliance test.

6. The method of claim 1, further comprising:

storing, in a recovery portion of the memory system, authoritative calibration information for the device, wherein the authoritative calibration information is stored during a manufacturing process or a distribution process.

7. The method of claim 6, further comprising:

determining an error in the calibration information stored in a secure storage portion of the memory system;

referencing, from the recovery portion of the memory system, the authoritative calibration information for the device; and storing, in the secure storage portion of the memory system, the referenced authoritative calibration information, wherein the authoritative calibration information is usable as calibration information to perform the compliance test.

8. The method of claim 7, wherein determining the error comprises:

determining that the error corresponds to tampering, the method further comprising:

communicating, to an authoritative agency, an indication of tampering with the calibration information.

9. The method of claim 7, wherein determining the error comprises:

determining that the error corresponds to physical damage or component degradation.

10. A method for operating an authentication platform, comprising:

receiving, from a compliance device, a request to obtain compliance information for a device;

verifying an identity of the compliance device based at least in part on receiving the request;

generating a signed request for performing a compliance test for the device using calibration information stored in a memory system of the device based at least in part on verifying the identity of the compliance device;

communicating, to the memory system of the device via a communication channel, the signed request for performing the compliance test;

receiving, from the memory system of the device via the communication channel, compliance information based at least in part on communicating the signed request to implement a compliance test, the compliance information comprising a result of the compliance test for the device; and communicating the compliance information for the device to the compliance device based at least in part on receiving the compliance information.

11. The method of claim 10, further comprising:

receiving, from a compliance device, a certificate containing information indicative of a compliance status for the device, based at least in part on communicating the compliance information; and communicating the certificate to the device.

12. The method of claim 10, wherein verifying an identity of the compliance device is based at least in part on at least one of a public key corresponding to the compliance device or a private key corresponding to the compliance device.

13. The method of claim 10, further comprising:

a memory system of the device comprising calibration information corresponding to the device and a cryptographic engine for encrypting the calibration information.

14. A memory system, comprising:

a controller for a memory device, wherein the controller is configured to cause the memory system to:

store, in the memory system comprising a cryptographic engine, calibration information in an encrypted format, the calibration information for a device including the memory system;

receive, at the memory system from an authentication platform via a wireless communication channel coupled with the memory system, a signed request for performing a compliance test for the device based at least in part on the calibration information; and communicating, from the memory system to the authentication platform via the wireless communication channel, compliance information based at least in part on receiving the signed request for performing the compliance test for the device, wherein a result of performing the compliance test for the device is based at least in part on decrypting the encrypted format of the calibration information using the cryptographic engine.

15. The memory system of claim 14, wherein the controller is further configured to cause the memory system to:

receive, at the memory system, a certificate containing information indicative of a compliance status for the device, based at least in part on communicating the compliance information.

16. The memory system of claim 14, wherein the controller is further configured to cause the memory system to:

encrypting, used the cryptographic engine of the memory device, the calibration information into the encrypted format.

17. The memory system of claim 14, wherein the calibration information is configured to cause the memory system to:

one or more parameters for control components of the memory device to perform the compliance test.

18. The memory system of claim 14, wherein the calibration information is configured to cause the memory system to:

operate conditions for performing the compliance test.

19. The memory system of claim 14, wherein the controller is further configured to cause the memory system to:

store, in a recovery portion of the memory system, authoritative calibration information for the device, wherein the authoritative calibration information is stored during a manufacturing process or a distribution process.

20. The memory system of claim 19, wherein the controller is further configured to cause the memory system to:

determine an error in the calibration information stored in a secure storage portion of the memory system;

referencing, from the recovery portion of the memory system, the authoritative calibration information for the device; and store, in the secure storage portion of the memory system, the referenced authoritative calibration information, wherein the authoritative calibration information is usable as calibration information to perform the compliance test.

* * * * *